United States Patent [19]

Asai et al.

[11] Patent Number: 4,914,527
[45] Date of Patent: Apr. 3, 1990

[54] RECORDING AND REPRODUCING DIGITAL VIDEO AND AUDIO SIGNALS TOGETHER WITH A TIME CODE SIGNAL WHICH IS WITHIN USER CONTROL WORDS OF THE AUDIO DATA

[75] Inventors: Toshiya Asai; Kaichi Tatsuzawa; Hiroki Kotani, all of Kanagawa, Japan

[73] Assignee: Sony Corporation, Tokyo, Japan

[21] Appl. No.: 328,523

[22] Filed: Mar. 24, 1989

Related U.S. Application Data

[63] Continuation-in-part of Ser. No. 35,371, Apr. 7, 1987, abandoned.

[30] Foreign Application Priority Data

Apr. 9, 1986 [JP] Japan .................. 61-081613
Mar. 31, 1988 [JP] Japan .................. 63-078635

[51] Int. Cl.⁴ .......................................... H04N 5/783
[52] U.S. Cl. .................... 360/10.3; 358/343; 360/19.1; 360/32; 360/40; 360/49
[58] Field of Search ........... 360/9.1, 10.1–10.3, 360/18, 19.1, 23, 32, 33.1, 40, 47, 49, 53; 358/335, 341, 343; 369/32, 47–49; 371/2; 375/26

[56] References Cited

U.S. PATENT DOCUMENTS

| | | | |
|---|---|---|---|
| 4,159,480 | 6/1979 | Tachi | 360/18 X |
| 4,167,028 | 9/1979 | Tobey | 360/18 X |
| 4,222,072 | 9/1980 | Bailey et al. | 371/2 X |
| 4,383,280 | 5/1983 | Copeland | 360/18 |
| 4,468,710 | 8/1984 | Hashimoto et al. | 360/19.1 X |
| 4,470,142 | 9/1984 | Ive | 371/2 |
| 4,473,850 | 9/1984 | Foerster et al. | 360/19.1 X |
| 4,484,236 | 11/1984 | Wilkinson | 360/19.1 X |
| 4,547,816 | 10/1985 | Sochor | 358/343 X |
| 4,551,771 | 11/1985 | Machida et al. | 360/19.1 |
| 4,558,376 | 12/1985 | Heitmann | 360/10.3 X |
| 4,587,577 | 5/1986 | Tsunoda | 360/18 X |
| 4,635,134 | 1/1987 | Sasamura et al. | 360/10.3 X |
| 4,652,942 | 3/1987 | Eto | 360/40 X |
| 4,656,536 | 4/1987 | Furumoto et al. | 360/47 X |
| 4,660,103 | 4/1987 | Wilkinson et al. | 358/343 X |
| 4,672,467 | 6/1987 | Heitmann | 360/19.1 X |
| 4,689,697 | 8/1987 | Wilkinson | 360/19.1 |
| 4,698,698 | 10/1987 | Collins | 360/10.3 X |
| 4,723,176 | 2/1988 | Ive | 358/343 X |
| 4,751,589 | 6/1988 | Kominami et al. | 360/10.3 |
| 4,751,590 | 6/1988 | Wilkinson | 358/343 X |

FOREIGN PATENT DOCUMENTS 58-23993 5/1983 Japan .

Primary Examiner—Alan Faber
Assistant Examiner—W. R. Young
Attorney, Agent, or Firm—Alvin Sinderbrand

[57] ABSTRACT

In recording a time code signal together with digital video and audio signals, at least one channel of a digital audio signal is supplied to rotary heads scanning successive slant tracks on a tape for recording in intermediate sections of the slant tracks, a digital video signal is supplied to the same heads for recording in other sections of the slant tracks situated before and after the intermediate sections and being relatively longer than the latter, and the time code signal is also supplied to the rotary heads for recording in the intermediate sections with the same time codes being represented by the time code signal recorded in the intermediate sections of a successive plurality of the slant tracks which contain the digital video signal for a respective frame.

26 Claims, 7 Drawing Sheets

RECORDING AND REPRODUCING DIGITAL VIDEO AND AUDIO SIGNALS TOGETHER WITH A TIME CODE SIGNAL WHICH IS WITHIN USER CONTROL WORDS OF THE AUDIO DATA

RELATED APPLICATION

This application is a continuation-in-part of a commonly assigned co-pending application for U.S. Letters Patent identified as Ser. No. 07/035,371, and filed Apr. 7, 1987, and now abandoned.

BACKGROUND OF THE INVENTION

1. Field of the Invention

This invention relates to a method and apparatus for tape recording and/or reproducing a time code signal together with digital video and audio signals.

2. Description of the Prior Art

In a conventional analog video tape recorder (VTR), for example, as shown in Japanese Patent Publication No. 23993/83, a time code signal, such as, an SMPTE time code, is recorded in a time code track extending longitudinally along a side edge of the magnetic tape, and also in a recording area for the vertical blanking period of each slant track in which the video is recorded. In the reproducing or playback mode, the time code signal is read from the longitudinal time code track along the side edge of the magnetic tape so long as the tape is being driven at an adequate speed, for example, as when the tape is being driven at the normal or standard speed used for recording and playback, or when the tape is being driven at a high tape speed, as in the fast-forward or rewind mode, or at a speed that is slightly reduced relative to the normal tape speed. However, when the tape is being driven at a very slow speed or when the tape is at rest, as in the still reproducing mode, the time code signal is read from the slant tracks. Thus, the time code data can be continuously obtained in the conventional analog video tape recorder without regard to the speed or direction of the tape drive.

In a digital VTR, the digital video signal is shuffled, for example, over 50 lines, before being recorded on the magnetic tape. Therefore, if the time code signal is recorded together with the digital video signal in the slant tracks, for example, as noted above in respect to the conventional analog VTR, it will be difficult to accurately read the time code signal in certain of the tape speed modes employed during playback or reproducing. Therefore, in conventional digital VTRs, the time code signal is recorded only in the time code track extending longitudinally along a side edge of the magnetic tape, and cannot be accurately read during playback in abnormal reproducing modes, such as, the still mode or the very low tape speed mode.

OBJECTS AND SUMMARY OF THE INVENTION

Accordingly, it is an object of this invention to provide a method and apparatus for tape recording a time code signal together with digital video and audio signals, and which avoids the above described disadvantages of the prior art.

More specifically, it is an object of this invention to provide a method and apparatus for tape recording a time code signal together with digital video and audio signals in a manner to permit the accurate reading of the time code signal during playback in either the normal reproducing mode or in any of the abnormal reproducing modes having abnormal tape speeds.

In accordance with an aspect of this invention, in recording a time code signal together with digital video and audio signals, at least one channel of a digital audio signal is processed into audio blocks each comprised of data words and user control words and which are supplied to rotary heads scanning successive slant tracks on a magnetic tape for recording in intermediate sections of the slant tracks, a digital video signal is supplied to the same heads for recording in other sections of the slant tracks situated before and after the intermediate sections and being relatively longer than the latter, and the time code signal is also supplied to the rotary heads for recording as the user control words in at least some of the audio blocks recorded in the intermediate sections with the time code signal in the audio blocks recorded in the intermediate sections of a successive plurality of the slant tracks, for example, containing the digital video signal for a respective frame, representing the same time code.

In accordance with a feature of this invention, the digital audio signal is processed in segments each corresponding, in duration, to the time required for scanning of a group of the slant tracks which are a fraction of the predetermined number of slant tracks containing the digital video signal for a respective frame, there are a plurality of channels of the digital audio signal to be recorded, each of the segments of the audio signal includes audio blocks respectively comprised of data words representing odd and even samples of each of the channels, each of the blocks further contains user control words, each of the above mentioned groups of slant tracks has a number of audio sectors in the intermediate sections thereof sufficient to record therein the respective audio blocks corresponding to odd and even samples of each of the channels and duplicates thereof in a scattered arrangement within the intermediate sections of the corresponding group of slant tracks, and the time code signal is recorded as the user control words of at least selected audio blocks of each audio segment corresponding to the odd and even samples of at least one of the channels and the duplicates of such selected blocks, with the time code signal being the same for all of the segments of the audio signal recorded in the intermediate sections of the slant tracks corresponding to a respective one of the frames.

When reproducing the time code signal recorded together with the digital video and audio signals in accordance with this invention, as aforesaid, and particularly when a so-called abnormal reproducing mode is being employed, the reproduced time code signal is separated, as by time demultiplexing, from the reproduced digital video and audio signals, erroneous bits are detected in the reproduced digital time code signal, those bits of each reproduced digital time code signal which are indicated to be free of error are stored, and, finally, time codes are read from the stored bits which are free of error and which are drawn from reproduced digital time code signals representing the same time code, that is, reproduced from the intermediate sections of those slant tracks which contain the digital video signal for a common frame.

In accordance with another feature of this invention, the time code data or information bits and the user bits which are associated therewith in the standard SMPTE time code signal are separated from each other and are separately recorded in respective user control word regions or bytes of the audio blocks recorded in the audio sectors of the slant tracks. By reason of such separation of the user bits of the SMPTE time code signal from the time code data or information bits at the recording of the latter in respective user control word regions or bytes which may be in a sequential order in the respective audio blocks, the processing of the reproduced time code signal may be simplified, particularly when such time code signal is being used in connection with the editing of the digital video signal.

The above, and other objects, features and advantages of the invention, will be apparent in the following detailed description of illustrative embodiments of the invention which are to be read in connection with the accompanying drawings.

DETAILED DESCRIPTION OF A PREFERRED EMBODIMENT

Initially, it should be noted that, for digital recording on magnetic tape, the smallest recordable wave length within which 2 bits can be recorded has been standardized at 0.9 micrometer, which allows the recording of 2.2 bits per micrometer. Further, the standard data rate for recording digital video signals is 216 Mbit/sec., so that, in the case of recording NTSC signals comprised of 60 fields per second, 3.6 Mbit need to be recorded for each field. Therefore, given the limitation of 2.2 bits per micrometer, a magnetic track with a length of 180 cm would be required for each field. If it were desired to record a field in a single, unsegmented helical or slant track having a length of 180 cm. on the magnetic tape, the diameter of the head drum would have to be greater than 50 cm. Accordingly, digital VTRs cannot record a field in a single unsegmented helical or slant track, but rather employ field segmentation for recording of the digital video signal.

More specifically, in the case of the digital recording of NTSC signals, out of the 262.5 lines constituting each field, only the last 250 lines from each field are recorded, and 10 helical or slant tracks are employed to record the information of one field of the video signal. The 250 lines of a field to be recorded are first divided into 5 video segments, each comprised of 50 lines and each recorded in 2 tracks. Further, in order to ensure minimum sensitivity of the recorded signal to head failures, drop outs or other tape defects, the incoming video signal is distributed among 4 adjacent tracks. Since the 2 tracks available for each segment of the video signal to be recorded cannot be divided by 4, 2 video sectors are formed within each helical or slant track and the data for each segment of the video signal are recorded in 2 pairs of video sectors respectively located in four adjacent slant tracks.

Figure 1:
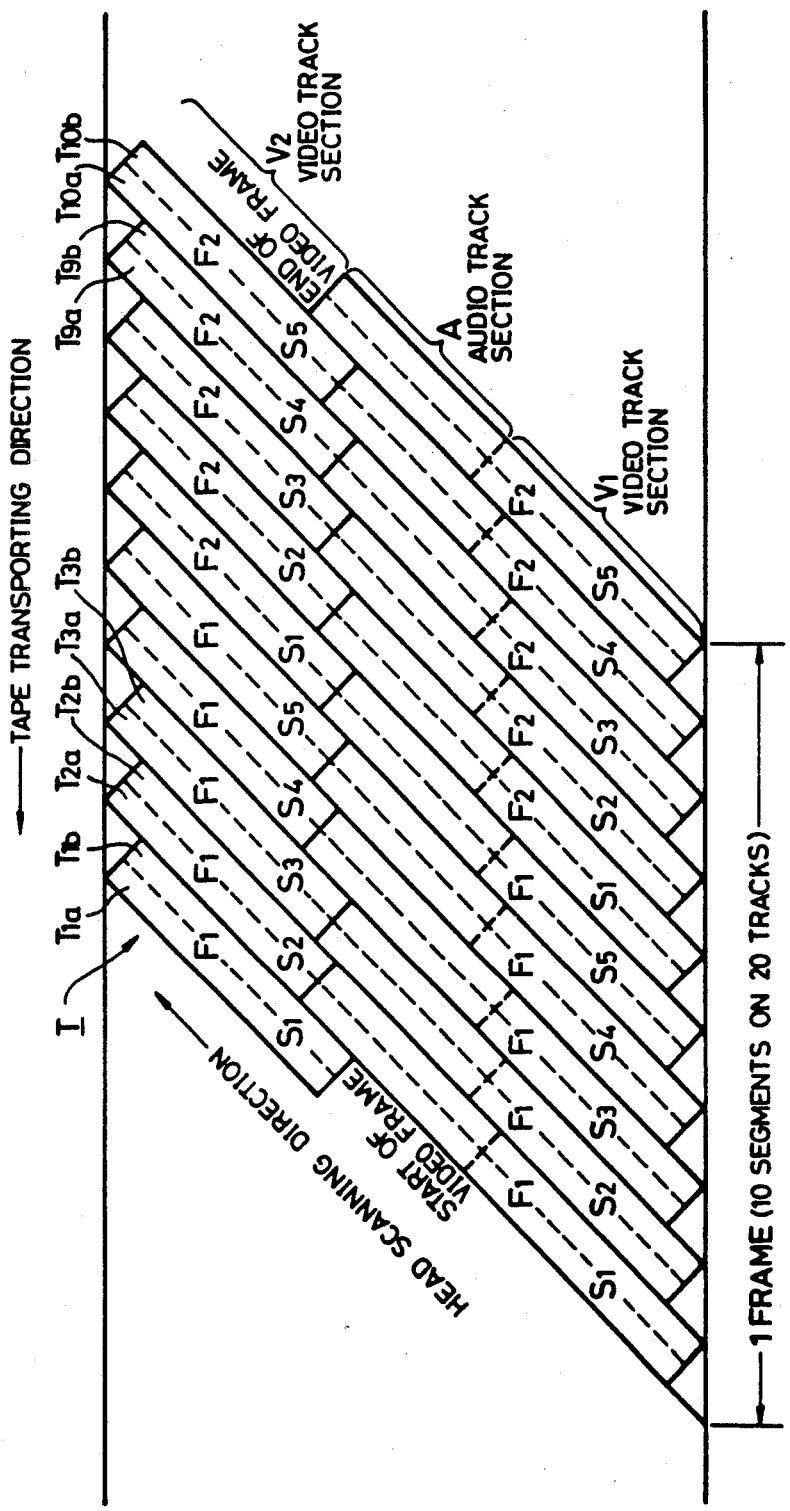
FIG. 1 is a schematic diagram showing a known pattern of slant tracks in which signals are recorded on a magnetic tape by a type of digital VTR to which this invention may be desirably applied.

A known digital VTR for recording and reproducing component digital video signals, for example, in the 4:2:2 component system, and which is of a type to which the present invention is advantageously applied forms the pattern of slant tracks T shown on FIG. 1. Such recorded pattern of slant tracks T is seen to include 10 pairs of slant tracks $T_{1a}$, $T_{1b}$; $T_{2a}$, $T_{2b}$; ... $T_{10a}$, $T_{10b}$, that is, a total of 20 slant tracks in which are recorded one frame (2 fields) of a digital video signal according to the NTSC system and also digital audio signals for 4 audio channels associated with the respective frame. Each of the slant tracks T is shown to include an intermediate section A for receiving the recorded audio signal, as hereinafter described in detail, and which is spaced from the opposite ends of the respective track, and video track sections $V_1$ and $V_2$ which are located before and after the intermediate audio track section A in the respective track T.

In FIG. 1, the video track sections which contain video sectors of the first and second fields of the illustrated frame are identified at $F_1$ and $F_2$, respectively, and the video track sections which contain video sectors included in the 5 different segments of each of the fields are identified at $S_1$, $S_2$, $S_3$, $S_4$ and $S_5$, respectively.

As earlier noted, each video segment is recorded in pairs of video sectors located in 4 adjacent helical tracks to be scanned by the different rotary magnetic heads. Thus, for example, in the track pattern shown on FIG. 1, the video segment $S_2$ of the first field $F_1$ is recorded in the pair of video sectors in video track section $V_2$ of tracks $T_{1a}$ and $T_{2b}$, and in the pair of video sectors in video track section $V_1$ of tracks $T_{3a}$ and $T_{3b}$.

In the known digital VTR of the type to which the present invention is desirably applied, audio records are formed independently for each of the 4 audio channels. The audio data of each of the 4 audio channels are processed in audio segments each corresponding in duration to 4 slant tracks or 1/5 of a video frame. Each of the slant tracks T contains 4 audio signal sectors disposed successively in the intermediate track section A between the 2 video sectors disposed in the respective track sections $V_1$ and $V_2$. Thus, in a complete scan by a head along one of the slant tracks T, the scanning head reproduces signals from a video sector in track section $V_1$, 4 audio sectors in track section A and another video sector in track section $V_2$. Although the audio track section A is shown on FIG. 1 to be almost as long as each of the video track sections $V_1$ and $V_2$, in actual practice, the audio track section A contains, for example, 5×134 bytes and is substantially shorter, in the scanning direction, than each of the video track sections $V_1$ and $V_2$ containing, for example, 160×134 bytes. The foregoing results from the fact that a digital audio channel has less than one-half of one percent of the video bit rate. Therefore, although the recording bit rate for the audio signal is almost the same as for the video signal, the transmission bit rate is much lower and the audio signal is endangered by individual errors on the tape to a greater degree than the video signal. Furthermore, the human ear is more sensitive to errors or defects than the human eye.

In order to reduce the sensitivity of the audio signal to errors, the prior art provides blocks respectively corresponding to odd and even samples of an audio segment of each of the four audio channels, and duplicates thereof, which are recorded in respective audio sectors in a scattered arrangement within the intermediate or audio track sections A of the group of 4 tracks T corresponding to the respective audio segment.

Figure 2:
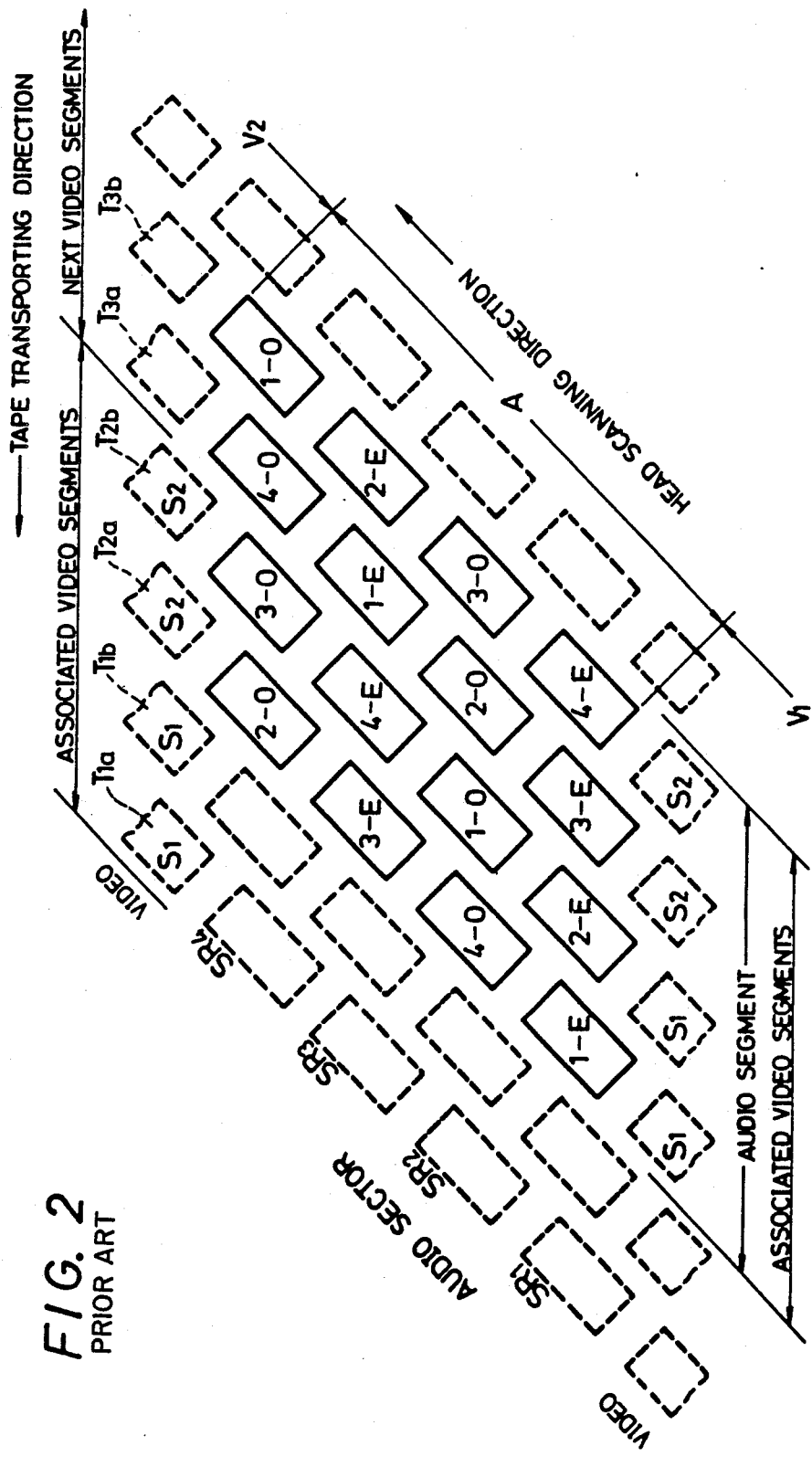
FIG. 2 is a more detailed schematic diagram showing a known arrangement of audio sectors within an audio signal segment recorded in the track pattern of FIG. 1.

Since each audio segment corresponds in duration to 4 slant tracks which each contain 4 audio sectors, 16 audio sectors are available for recording the 16 blocks comprised of odd and even samples of 4 audio channels and duplicates thereof, and the 16 audio sectors making up an audio segment are preferably recorded in the optimum distribution or scattered arrangement shown on FIG. 2.

The optimum distribution shown in full lines on FIG. 2 is, for example, for the audio segment corresponding in duration to the 4 slant tracks $T_{2a}$, $T_{2b}$, $T_{3a}$ and $T_{3b}$. In such distribution, 4 rows of audio sectors $SR_1$, $SR_2$, $SR_3$ and $SR_4$ are arranged in the 4 slant tracks $T_{2a}$, $T_{2b}$, $T_{3a}$ and $T_{3b}$ in the scanning direction of the heads. The first audio sectors in the 4 tracks, and which appear in the order 1.E, 2.E, 3.E and 4.E in the row $SR_1$, respectively contain even samples of the first, second, third and fourth audio channels. In the second row $SR_2$, the audio sectors appearing in the order 4.0, 1.0, 2.0 and 3.0, respectively contain odd samples of the fourth, first, second and third audio channels. The audio sectors 3.E, 4.E, 1.E and 2.E appearing in that order in the third row $SR_3$ contain the same data as the similarly identified sectors in row $SR_1$, but with such sectors appearing in a different order. Similarly, the sectors 2.0, 3.0, 4.0 and 1.0 appearing in that order in row $SR_4$ have the same data recorded therein as in the correspondingly identified audio sectors in row $SR_2$, but with the order of such sectors being changed.

Each audio segment contains approximately 320 samples of each audio channel. Each segment of each audio channel is processed into 2 audio blocks of 10×60 bytes, each corresponding to a respective sector. One block contains approximately 160 data words corresponding to the even samples, as shown on FIG. 3, while the other block similarly contains approximately 160 data words corresponding to the odd samples. In each case, as shown, the data portion of the block is 7×60, that is, data words are arranged in the rows identified as ROWS 0, 1, 2, 3, 6, 8 and 9, While ROWS 4, 5 and 7 contain outer error protection data of the Reed-Solomon type. Each block, and hence each audio sector, is further shown to include user control words, interface control words and processor control words.

More particularly, each block, and hence each audio sector, has a data format including data regions WORD 0, 1, 2, ..., 160, check character data regions PV0, PV1, PV2 and contains 8 user control words of 8 bits each which, in the illustrated even block, are identified as USER 0, 2, 4, 6, 8, 10, 12 and 14, respectively.

The interface control words are shown, for example, to include a channel use word CHAN of 4 bits which specifies the usage of two input channels in an interface data stream, a preemphasis word PREF of 4 bits which specifies the usage of pre-emphasis in the audio coding, an audio data mode word LNGH of 4 which is written 4 times in each block for security and which specifies the audio word length and the usage of the ancillary bits Status User and Validity, and block sync location words S MARK 0 and S MARK 1, each of 8 bits which specify the location of the first and last block sync associated with channel status and user data.

The processing control words include a word count word B CNT of 4 bits written 4 times in each block for security and specifying the number of useful data words in such block, a sequence word SEQN of 4 bits also written 4 times in each block and which specifies a sequence of 15 blocks to aid processing in high-speed data recovery, and an overlap edit word E LAP of 4 bits which specifies the segment associated with an overlap edit transition.

As earlier noted, each block or audio sector includes 8 user control words or regions of 8-bit length, that is, of 1 byte each, and, therefore, each audio sector includes a total of 8 bytes of user control regions. The SMPTE time code signal consists of codes representing hours, minutes, seconds and frames, or of 8 bytes excluding the sync code, as will be also apparent from the previously noted Japanese Patent Publication No. 23993/83.

Generally, in accordance with the present invention, the above noted SMPTE time code signal is recorded as the user control words of selected blocks of each audio segment corresponding to the odd and even samples of at least one of the audio channels and the duplicates of such selected blocks, with the recorded time code signal being the same for all of the segments of the audio signal recorded in the intermediate sections A of the slant tracks T corresponding to a common one of the video frames. By way of example, the SMPTE time code signal, which consists of codes for hours, minutes, seconds and frames at 30 Hz, may be recorded in the 8 user control word regions of the sectors 4.E and 4.0 in which are recorded the even and odd samples, respectively, of the fourth audio channel, with the time code signal recorded as the user control words in audio sectors 4.E and 4.0 being, in a first embodiment of the invention, the same for all of such audio sectors in the 20 slant tracks T containing the digital video signal for one video frame. Since there are 5 audio segments corresponding to each video frame and 16 audio sectors in each audio segment as indicated clearly on FIG. 2, there are a total of 80 audio sectors recorded in the intermediate sectors A of the slant tracks containing one video frame and, in the described example of the invention, the SMPTE time code signal is recorded as the user control words int he remaining 60 audio sectors recorded in the slant tracks containing one video frame are still available for other desired control purposes. It will be appreciated from FIG. 2 that, as a result of the scattered arrangement of the 16 audio sectors corresponding to an audio segment, the audio sectors 4.E and 4.0 containing the recorded SMPTE time code signal are differently positioned in each of the 4 slant tracks corresponding to an audio segment, thereby increasing the probability that audio sectors containing the recorded SMPTE time code signal will be scanned by rotary heads of the digital VTR even during playback in abnormal reproducing modes. Further, it should be understood that the positions and numbers of the audio sectors in each audio segment in which the time code signal is recorded may be changed from that indicated above, that is, the time code signal may be recorded as the user control words in audio sectors in addition to, or other than the indicated audio sectors 4.E and 4.0 so long as the recorded SMPTE time code signal does not interfere with other user control data being recorded in the respective audio sectors.

Figure 3:
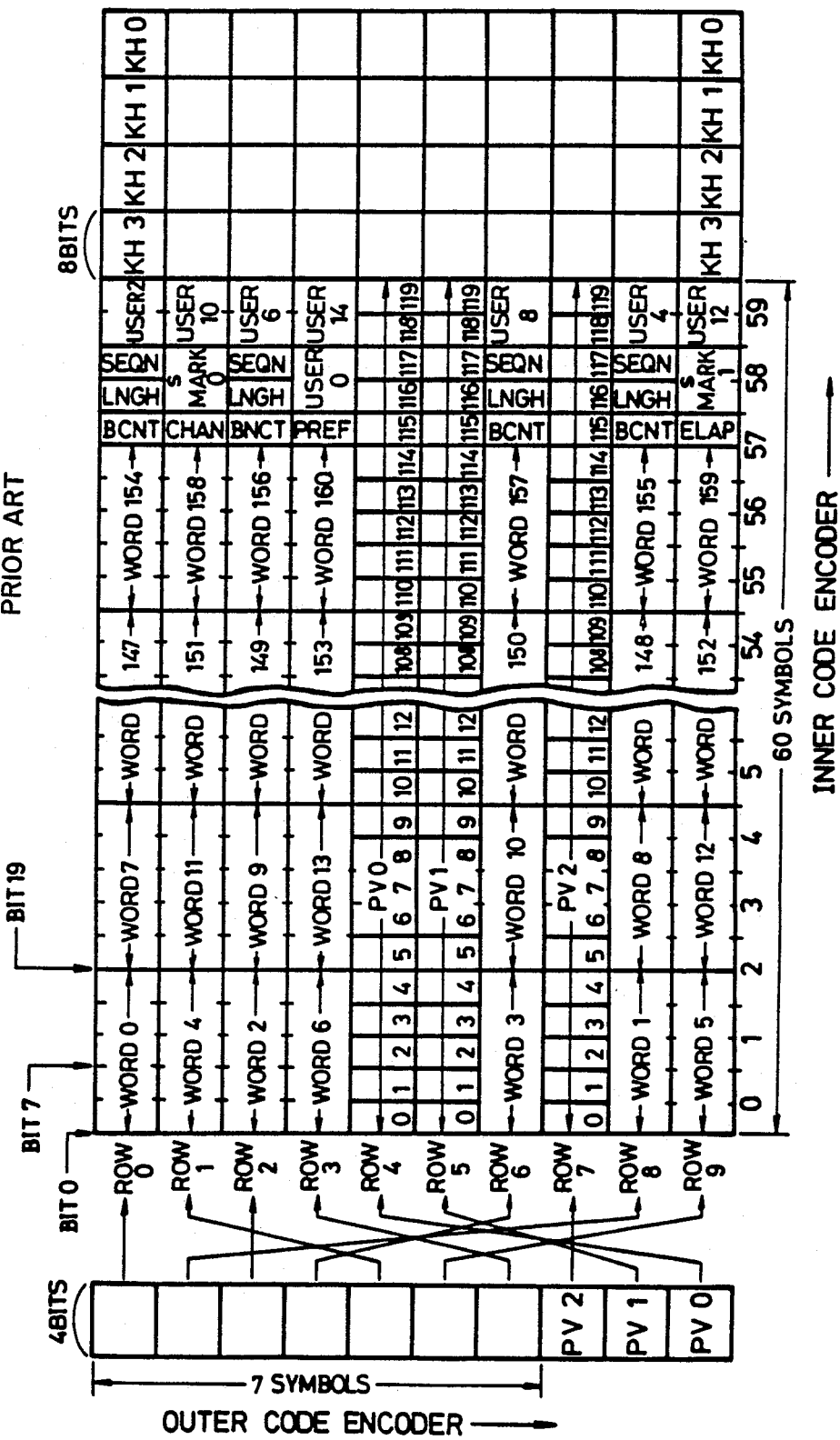
FIG. 3 is a diagrammatic view showing a known audio data block layout used in digital recording in the track pattern of FIG. 1.
Figure 4:
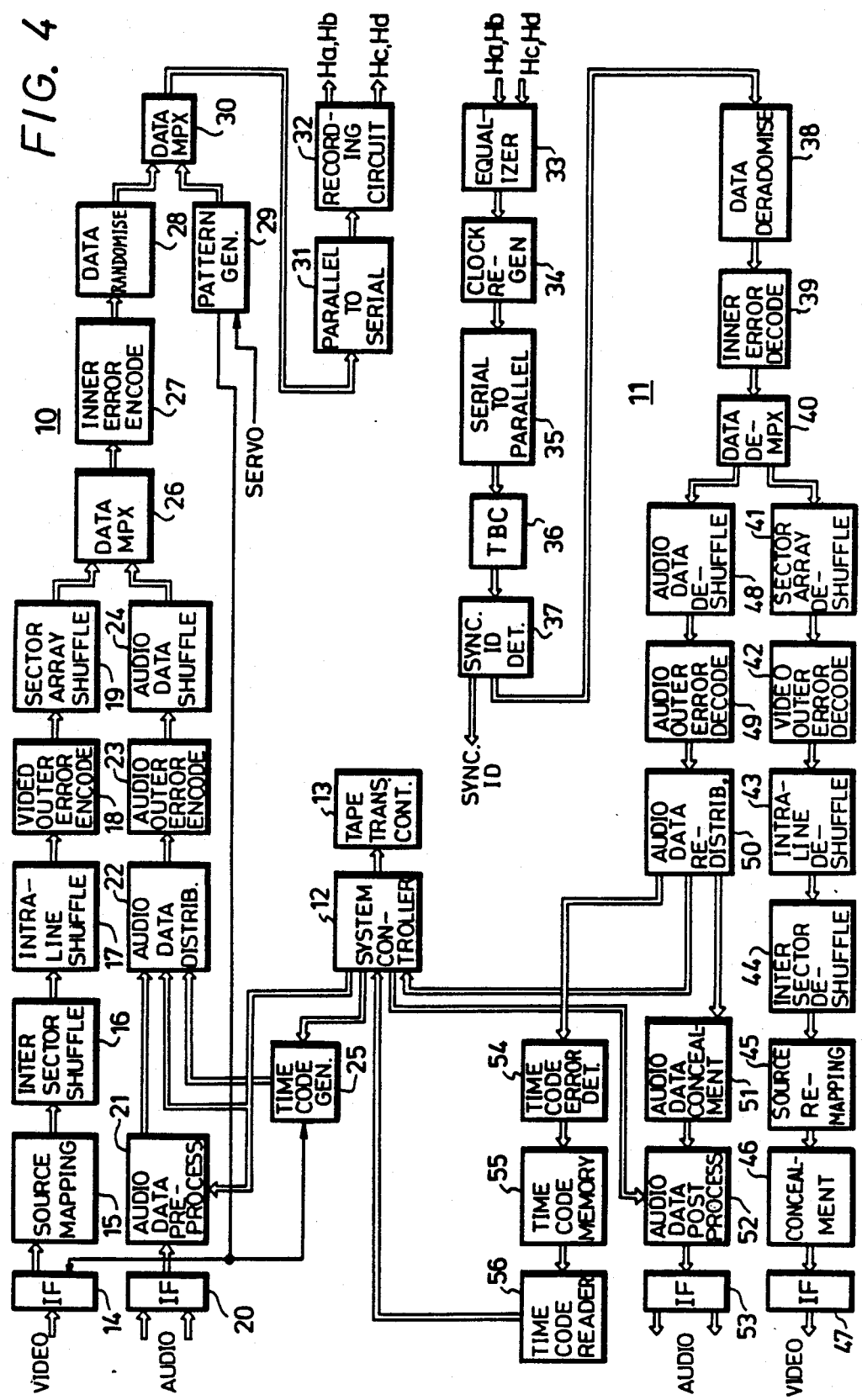
FIG. 4 is a schematic block diagram showing recording and reproducing sections of the digital VTR according to an embodiment of this invention.
Figure 5:
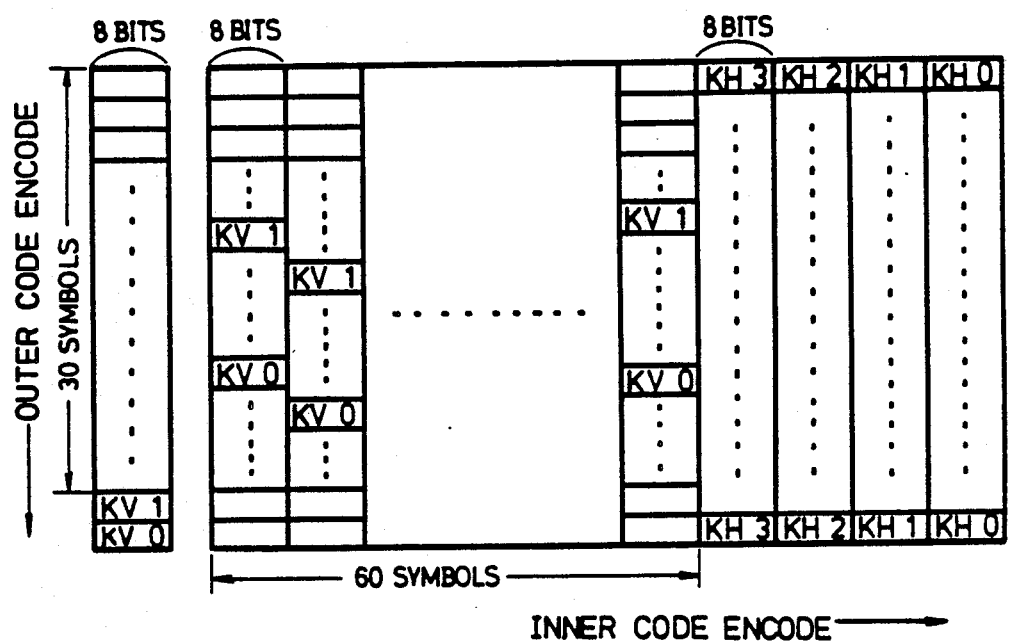
FIG. 5 is a diagrammatic view showing outer error correction encoding and inner error correction encoding for video data used in the prior art in a digital VTR of the type to which this invention is desirably applied.

Referring now to FIG. 4, it will be seen that a digital VTR for recording and reproducing a time code signal together with digital video and audio signals according to an embodiment of this invention includes a recording section 10 and a reproducing section 11 associated with a system controller 12 and a tape transport controller 13 by which the speed of movement of the magnetic tape is controlled for determining the reproducing mode. In the recording section 10, the input digital video signal, consisting of 250 lines per field and 720 pixels per line, is supplied through an input interface 14 to a source mapping circuit 15 which carries out one-for-one mapping of each video data byte in a known manner so that, for the most probable distribution of digital errors, there is a reduction in the subjective peak error produced in a pixel and the DC component of the signal is reduced. The mapped video data bytes are supplied to a distributor 16 constructed, for example, as a demultiplexer which effects inter-sector shuffling, that is, the distribution of the 50 lines making up a video segment (one-fifth of a field) among four corresponding video sectors in a predetermined sequence so as to increase the probability that uncorrectable samples are surrounded by error-free data words to permit so-called error concealment. The distributed video signal from distributor 16 is supplied to an intra-line shuffling circuit 17 having four memories for the four sectors, which effects the distribution of the samples within each line and within each sector so as to form video data outer code blocks. In the next block 18 outer error coding is effected on the outer code blocks by adding 2 bytes KV0, KV1 to every 30 bytes of the video signal for use as check words in detecting and correcting errors during reproduction. Then, sector array shuffling is effected in a block 19, that is, within each video sector, the sample bytes representing the pixels and the check bytes are rearranged so as to be recorded in a pseudo-random sequence rather than in chronological order, as illustrated in FIG. 3. The combination of intra-line shuffling by block 17 and sector array shuffling by block 19 constitutes an intra-sector shuffling.

Figure 6:
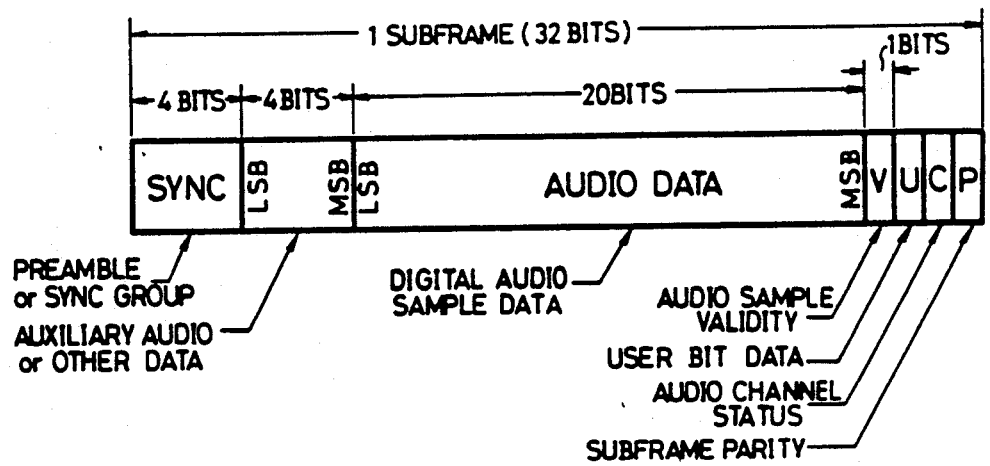
FIG. 6 is a diagrammatic view showing a known input audio data block layout receivable by the digital VTR to which this invention is advantageously applied.

The input digital audio signal for each of the four audio channels is supplied in the AES/EBU format shown in FIG. 6. Each subframe is 32 bits long and includes 4 bits of synchronizing data, 4 bits of auxiliary audio data, 20 bits of audio data, and 1 bit each of validity data, user data, channel data and parity data. This input audio data is applied through an input interface 20 to an audio data preprocessor 21 in which the audio data for each audio segment is distributed among the 16 audio sectors corresponding to the odd and even samples of the four audio channels and duplicates thereof, respectively, as earlier described. In particular, in audio data preprocessor 21, 20 bits are selected from the 24 bits comprising the audio, validity, user, channel and parity data to form words 20 bits long, under the control of a system controller 12 discussed below. For example, when the sampling frequency for the digital audio data is approximately 48 kHz, there are about 1600 samples per channel in each frame, and the samples in each frame are distributed by audio data distributor 22 to 10 audio sectors each of which may contain 160 audio samples. The audio signal is then passed through a block 23 in which outer error coding of the audio signal is effected. In particular, the audio data in word data regions WORD 0, 1, ..., 160, the SMPTE time code signal in the 8 user data regions and the additional control data in the other regions are supplied to block 23 in units of 4 bits so as to generate check characters 4 bits long for the data regions PV0, PV1, etc. forming the audio data outer error correction code as shown in FIG. 3. It is not necessary to add CRC codes (Cyclic Redundancy Check Codes) such as the Vertical Interval Time Codes (VITC) for the time codes since the audio sector time code (ASTC) is itself protected by the error correction codes for the audio data. It is also not necessary to add the VITC as a field mark, as the reproduced time code is identified by the segment ID and the sector ID, nor to add sync bits, as sync data is recorded in each audio sector. Then, the audio signal is subjected to shuffling in a block 24, that is, the audio data words in each audio sector are rearranged in a pseudo-random sequence, as further shown in FIG. 3. The digital video signal from block 19 and the digital audio signal from block 24 are supplied to a time-multiplexer 26 which generates a signal with a sequence of video and audio sectors corresponding to the track pattern shown on FIG. 1, that is, with two video sectors to be recorded in the track sections $V_2$ and $V_1$ followed by four audio sectors to be recorded in the intermediate audio track section A.

Further, in the recording section 10 of the apparatus embodying this invention, a time code generator 25 receives a video sync signal from the interface 14 and provides, in synchronism therewith, an SMPTE time code signal which, for example, is suitably supplied under the control of system controller 12 to the audio data distributor 22 so that the 8 bytes of the time code signal appear at the 8 user control word regions of the selected audio sectors, for example, the audio sectors 4.E and 4.0, as earlier described. Thus, in the time-multiplexed data stream from multiplexer 26, the selected audio sectors 4.E and 4.0 contain the corresponding time code signal in the respective user control word regions, and such time code signal only changes from frame to frame.

The digital output signal from multiplexer 26 is supplied to an inner error encoder 27 in which additional check bits are added for improving error protection. In particular, the data words of each audio data block are converted into 60 bytes, each 8 bits long, so that they may be inner error encoded together with the video data. The inner error encoding creates blocks having 60 data bytes and 4 check bytes KH0-KH3, as illustrated in FIGS. 3 and 6. In order to reduce the DC content of the digital video and audio signals prior to recording, the output of inner error coder 27 is supplied to a block 28 in which it is randomized or scrambled. At this point, the digital signal is still in byte form and, for the purposes of recording, this byte-oriented signal is supplied through a multiplexer 30 and is converted into a serial bit signal in a parallel-to-serial converter 31. However, in order to enable the byte limits to be detected in the serial bit flow, a suitable identification is recorded together with the serial signal. For this purpose, each video sector is converted into 160 sync blocks and each audio sector is converted into 5 sync blocks, with each sync block consisting of a synchronization pattern and an additional identification pattern, followed by 128 bytes of video or audio data, as the case may be. A circuit 29 timed by the video sync signal from input interface 14 is provided for generating the necessary sync and identification patterns which are supplied to multiplexer 30 for suitable time-multiplexing with the digital video signal and digital audio signal with which the time code signal is associated. Finally, the output of multiplexer 30 is supplied to parallel-to-serial converter 31 and the resulting serial signal is then supplied to a recording circuit 32 for application to a rotary head assembly having four heads Ha, Hb, Hc, Hd which have closely arranged gaps for recording in adjacent slant tracks.

In the reproducing section 11 of the apparatus illustrated on FIG. 4, the signals reproduced by the 4 rotary heads Ha, Hb, Hc, Hd are supplied to a recording circuit 33 including an equalizer which extracts binary data signals therefrom. The extracted signals are supplied to a clock regeneration circuit 34 for regenerating the clock signals in the binary data and thence to a serial-to-parallel converter 35 and a time base correcting circuit 36. From there the time base corrected data are supplied to a detector 37 which detects the synchronization and identification patterns for use in the serial to parallel converter 35 in converting the reproduced serial signal back to the byte-oriented or 8-bit parallel data format. The detected synchronization pattern is further used to achieve the correct derandomization of the byte-oriented signal in a derandomizer 38, whereupon the derandomized signal is supplied to an inner error detection/correction circuit 39. In such circuit 39 the inner error code is used to correct errors in the video data, audio data and the time code signal data in the user data regions where possible by using the 4 check bytes KH0-KH3, which can correct errors up to 2 bytes. However, for most of the errors, the inner error code is suitable only for determining that errors have occurred within an error protection block which is then identified by a respective flag. Thereafter, as will be described, the outer code is used for determining where, within a flagged block, errors have occurred.

Following the inner error detection/correction in circuit 39, the video signal path, and the audio and time-code signal paths diverge through a data demultiplexer 40. In the video signal path, the original chronological sequence of the samples is reinstated in an intra-sector deshuffling circuit 4 and then the outer code is used in a circuit 42 to detect the flagged blocks and to correct the errors therein, wherever possible. Then, an intra-line deshuffle is effected in a deshuffler 43 and an inter-sector deshuffle is effected in a deshuffler 44, and source remapping is carried out in a circuit 45. Finally, in the video path, a circuit 46 may be provided for effecting concealment of those errors remaining after the outer error correction, and also for effecting time base correction, whereupon the reproduced digital video signal is derived through an interface 47.

Similarly to the above, in a path shared by the audio and time code signals from the circuit 39 through the demultiplexer 40, the original chronological sequence of the samples in the audio sectors is reinstated in an audio data deshuffling circuit 48, whereupon the outer code is used to detect the errors in the flagged blocks and to correct such errors, if possible, in an outer error correction circuit 49. In particular, erroneous time code signals and erroneous audio data are corrected up to 3 characters of 4 bits each by using the 4 bit check characters PV0, PV1, PV2 of the audio outer error correction code, which has a greater error correcting efficiency than the corresponding video outer error correction code using check bytes KH0-KH3. In the next block or redistributor 50, the distribution of the audio data for each audio segment among the respective sixteen audio sectors is reversed, and the corrected control data other than the corrected time code signals are supplied to system controller 12. The redistributed audio data is supplied to an error concealment and time base correcting circuit 51 in which any remaining uncorrected audio data identified by error flags added in inner error decoder 39 and audio data outer error decoder 49 are concealed and time base correction is effected. The audio data from block 51 are then supplied to an audio data post-processing circuit 52 to be reformed into the AES/EBU format shown in FIG. 6 and then to an output interface 53 from which the several audio channels are output.

The time code signal recorded at the user control word regions of selected audio sectors, for example, the audio sectors 4.E and 4.0 as described above, is extracted from the data flow at redistributor 50 and supplied to a time code error detector 54 which detects error flags raised at the user control word regions in those cases where the reproduced time code signal could not be corrected for error. A memory 55 is provided to store the error flags identifying those user control word regions of the selected audio sectors at which errors have been detected, and further to store the data appearing in the user control word regions at which no error flags are raised, whereupon, as hereinafter further described, a time code reader 56 can read or assemble a time code signal from the stored data.

The above described arrangement operates as follows for reading the recorded time code signal:

In the normal-speed reproducing mode, and in reproducing operations employing tape speeds close to the normal speed, as established by tape transport control 13, a time code signal recorded at the user control word regions of an audio sector 4.0 or 4.E is reproduced from each scanned track T so that time code signals of the same data content are reproduced 20 times during each video frame. Since some of these reproduced time code signals may not have been corrected for error in block 39, the resulting error flags are detected in block 49. Further, in the normal speed reproducing mode, system controller 12 causes memory 55 to store the time code signal recorded at the user control word regions of an audio sector for which no error flags have been raised. The time code reader 56 reads or indicates the time code identified by the first time code signal indicated to be free of error among the 20 time code signals reproduced during a video frame.

When a high-speed reproducing mode is established by control 13, time code signals having different data contents as to hours, minutes, seconds and/or frames may be reproduced at random during a frame period. In other words, in the normal speed reproducing mode, during each frame which comprises 5 audio segments, the time code signals obtained from the sectors 4.E and 4.0 of the 5 audio segments all have the same data content, whereas, in the high-speed reproducing mode, the time code signals reproduced from the sectors 4.E and 4.0 of the 5 audio segments occurring during a frame period have different data contents. In the high-speed reproducing mode, if the respective audio sectors 4.E and 4.0 reproduced during a frame period are found to have no error flags raised at any of its user control word regions, system controller 12 causes the time code signal recorded at such error-free user control word regions to be read by reader 56. If two or more audio sectors 4.E, 4.0 are reproduced during a frame period with no error flag raised at any of the user control word regions of such audio sectors, system controller 12 causes time code reader 56 to read the time code signal read from the audio sector in the earliest occurring audio segment. If, in the high-speed reproducing mode, no audio sector 4.E, 4.0 is reproduced during a frame period without any error flags raised at the respective user control word regions, then time code reader 56 continues to indicate the last established time code, for example, the time code corresponding to the time code signal read during the previous frame period. Since it is not necessary to accurately maintain the continuity of the time code in the high-speed reproducing mode, the foregoing procedure for determining the time code is satisfactory in that reproducing mode.

On the other hand, in the low-speed or still reproducing mode, it is desirable to maintain the continuity of the time code as much as possible even though, in some scans across the tape, the time code signal may not be reproduced. Therefore, in the low-speed or still reproducing mode, system controller 12 responds to the establishment of such mode by tape transport control 13 to perform the following steps:

(1) If, during a frame period, an audio sector 4.E or 4.0 is reproduced with no error flag raised at any of its user control word regions, the time code data recorded at such regions is read to determine the respective time code.

Figure 7:
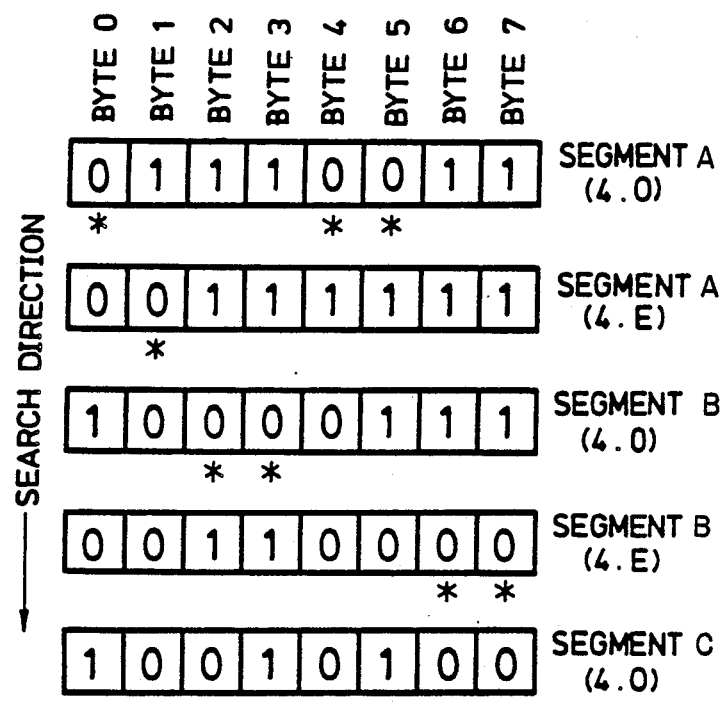
FIG. 7 is a schematic diagram illustrating error detection in successive time code signals reproduced during scanning across the tape in an abnormal reproducing mode, and to which reference will be made in explaining how a time code signal is accurately read even in such abnormal reproducing mode.

(2) if no audio sector 4.E or 4.0 is reproduced during a frame period without any error flag at its user control word regions, a time code assembling procedure is employed under the control of system controller 12. More specifically, in such procedure, during the scanning of each track in a frame period, only data recorded at user control word regions at which no error flags are raised are collected or stored in memory 55 and, upon the collection of error-free data for each of the 8 bytes of the time code signal, the latter is assembled from the stored data. for example, as shown diagrammatically on FIG. 7, during a frame period, the user control word regions of the audio sectors in the several audio segments in a frame are checked in error detector 49 for the presence of error flags thereat in the order of the sectors 4.0, 4.E of audio segment A, sectors 4.0, 4.E or audio segment B, sectors 4.0, 4.E of audio segment C, and so forth. In FIG. 7, the symbol "O" has been applied to identify each user control word region at which no error flag is raised, while the symbol "1" is applied to indicate the presence of an error flag at the respective user control word region. As the detection of the error flags proceeds, data corresponding to a particular byte of the time code signal and appearing for the first time at a user control word region which does not have an error flag associated therewith is collected or stored in memory 55, as indicated by an * appearing under the respective region on FIG. 7. Finally, when correct data has been collected or stored in respect to the 8 bytes of a time code signal, for example, at the completion of audio sector 4.E of audio segment B in FIG. 7, reader 56 assembles the respective time code signal from the stored data.

(3) The time code signal which is assembled, as described above, is suitably compared in system controller 12 with the previously available time code signal to determine if continuity of the time code has been maintained. If such continuity does exist, the assembled time-code signal is employed. On the other hand, if continuity does not exist, the procedure for collecting the data and assembling a time code signal therefrom is repeated. The foregoing operation is employed in order to exclude from use any time code signal composed of data derived from audio sectors corresponding to different frames of video.

In the above description of an embodiment of this invention, the time code signal has been recorded in only the audio track sections A of the slant tracks. However, it will be apparent that the time code signal may also be recorded in a longitudinal track extending along a side edge of the magnetic tape, as in the prior art, so as to permit the reproduction of the time code signal either from the slant tracks or from the longitudinal track, as circumstances might require.

Figure 8:
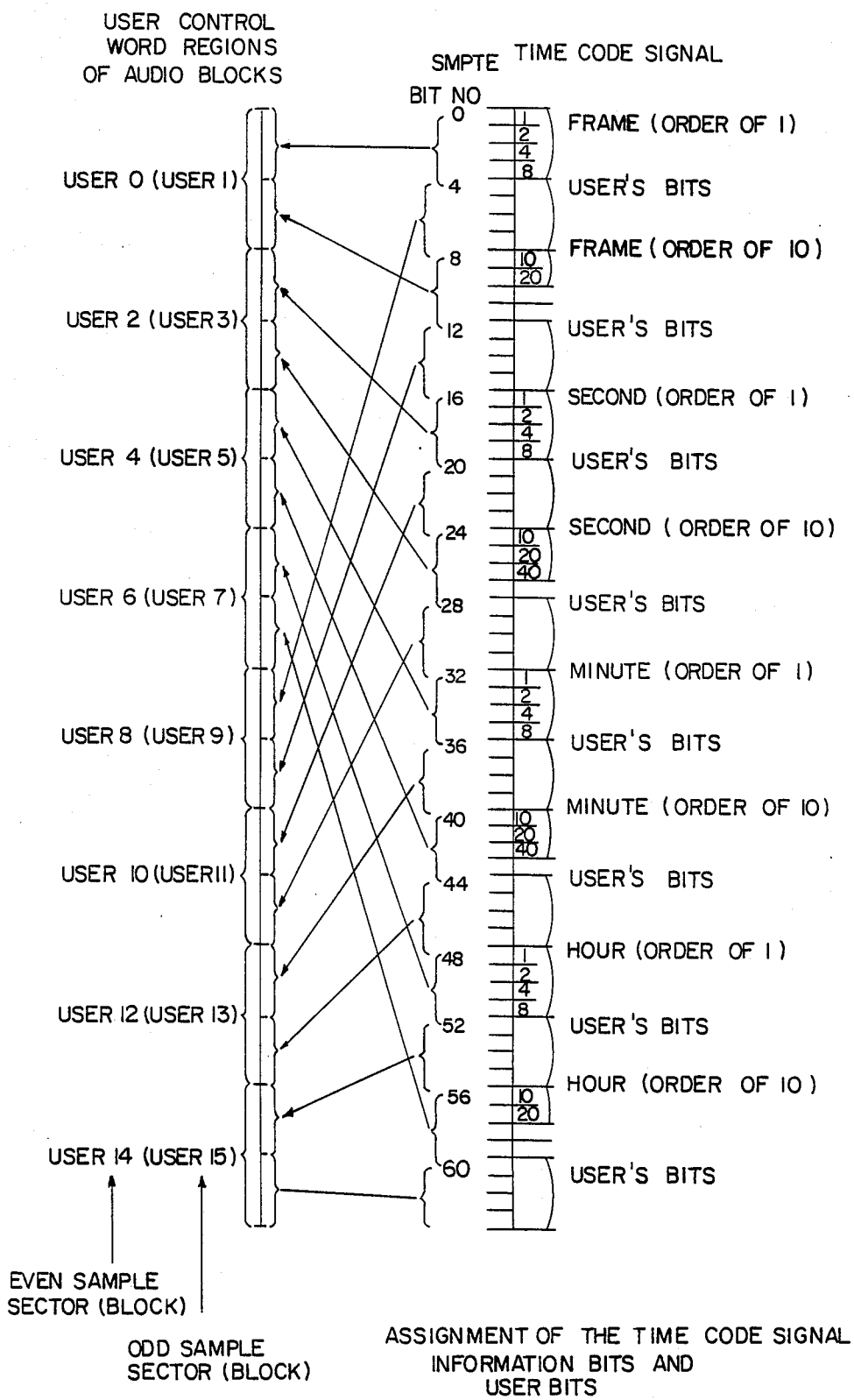
FIG. 8 is a schematic diagram showing a standard time code signal format and illustrating the manner in which time code information bits and user bits of such time code signal are distributed for recording as user control words in the processed audio blocks recorded as the audio sectors in another preferred embodiment of the invention.

As is well known and shown at the right hand side of FIG. 8, each of the 8 bytes of the SMPTE time code signal includes user bits as well as the respective time code data or information bits. In the previously described embodiment of this invention, the SMPTE time code signal is recorded as it is, that is, without separating the time code data or information bits from the user bits of the respective bytes. Thus, each of the audio sectors, for example, the sectors 4.E and 4.0, in which the SMPTE time code signal is recorded will have user bits, as well as time code data or information bits, recorded in each of its 8 user control word regions USER 0, USER 2, USER 4, USER 6, USER 8, USER 10, USER 12 and USER 14, in the case of the audio sector or block in which even samples are recorded, or user control word regions USER 1, USER 3, USER 5, USER 7, USER 9, USER 11, USER 13 and USER 15, in the case of the audio sector or block in which odd samples are recorded.

When the time code data or information bits and the user bits included in each of the bytes of the SMPTE time code signal are recorded in the same respective user control word region of the audio block or sector, all of the user control word regions USER 0-USER 14 or USER 1-USER 15 of the audio block or sector will contain time code data or information bits. Therefore, it is necessary to reproduce all of the user control word regions USER 0-USER 14, or USER 1-USER 15, of the audio blocks or sectors and to decode the reproduced time code signal when the latter is used in connection with editing of the digital video signal and/or when the user bits of the time code signal need to be rewritten for any reason. By reason of the foregoing, the processing circuit for separation of the reproduced time code signal into its time code data or information bits and its user bits and for the timing control thereof becomes undesirably complex.

In order to avoid the foregoing problem, in accordance with another embodiment of this invention illustrated in FIG. 8, the time code data or information bits and the user bits of the SMPTE time code signal are separated from each other prior to recording, for example, by the time code generator 25 under the control of the system controller 12, and the separated time code data or information bits and user bits are then assembled with the audio data in the distributor 22 so as to be separately recorded at respective user control word regions of audio blocks or sectors within the intermediate audio track sections A of slant tracks corresponding to one frame of the video signal
recorded in the video track sections $V_1$ and $V_2$.

As shown at the right hand side of FIG. 8, the SMPTE time code signal is comprised of 64 bits (8 bytes) of which 32 are user bits while the remaining 32 bits include time code data or information bits indicating the "1"s and "10"s orders of frames, seconds, minutes and hours, respectively. Since each audio block has 8 user control word regions with a total capacity of 8 bytes, as represented at the left-hand side of FIG. 8, it is possible to record a unit of the SMPTE time code signal in the user control word regions of a single audio block (FIG. 3), but with the separated time code data or information bits and the user bits being separately recorded in different user control word regions. For example, as in the embodiment of the present invention shown in FIG. 8, in the case of an audio sector or block in which even samples are recorded, the time code data or information bits may all be assigned to the user control word regions USER 0, USER 2, USER 4 and USER 6, while the user bits are all assigned to the user control word regions USER 8, USER 10, USER 12 and USER 14, whereas, in the case of an audio block in which odd samples are recorded, the time code data or information bits are all assigned to the user control word regions USER 1, USER 3, USER 5 and USER 7 and the user bits are all assigned to the user control word regions USER 9, USER 11, USER 13 and USER 15. More specifically, in the embodiment of FIG. 8, one byte, that is, all of the frames information bits, are assigned to the user control word region USER 0 in the case of an even sample block, or to USER 1 in the case of an odd sample block; one byte, that is, all of the seconds information bits are assigned to the user control word region USER 2 in the case of an even sample block, or to USER 3 in the case of an odd sample block; one byte, that is, all of the minutes information bits are assigned to the user control word region USER 4 in the case of an even sample block, or to USER 5 in the case of an odd sample block; and one byte, that is, all of the hours information bits are assigned to the user control word region USER 6 in the case of an even sample block, or to USER 7 in the case of an odd sample block. Further, all of the separated user bits of the time code signal are assigned to the user control word regions USER 8, USER 10, USER 12 and USER 14 in the case of an even sample block, and to USER 9, USER 11, USER 13 and USER 15 in the case of an odd sample block.

Since the time code data or information bits and the user bits of the SMPTE time code signal are separately recorded, that is, assigned to different user control word regions of the audio blocks, in accordance with the embodiment of the invention being here described, the processing required for separating and timing the reproduced frames, seconds, minutes and hours information of the reproduced SMPTE time code signal is relatively simplified.

Having specifically described embodiments of the present invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for tape recording a time code signal together with digital video and audio signals comprising:
   scanning successive slant tracks extending obliquely across a tape;
   processing at least one channel of a digital audio signal into audio blocks each comprised of data words and user control words;
   recording said audio blocks in intermediate sections of said slant tracks which are spaced from the opposite ends of the respective tracks;
   recording a digital video signal in other sections of said slant tracks which are located before and after said intermediate sections considered in the direction of said scanning; and
   recording a time code signal as said user control words in at least some of said audio blocks recorded in said intermediate sections of said slant tracks, with said time code signal in said audio blocks recorded in the intermediate sections of a successive plurality of said slant tracks representing the same time code.

2. A method according to claim 1; in which said other sections of each slant track are relatively long in respect to said intermediate sections containing the digital audio signal and time code signal.

3. A method according to claim 1; including recording a digital video signal for each field in said other sections of a plurality of said slant tracks, and in which the same time codes are represented by the time code signal recorded as said user control words in at least some of said audio blocks recorded in said intermediate sections of the slant tracks which have the digital video signal for two fields recorded in said other sections thereof.

4. A method according to claim 1; in which said time code signal includes time code data and user bits associated therewith in respective bytes; and including separating said time code data and said user bits from the respective bytes of the time code signal, and recording the separated time code data and user bits as respective ones of said user control words in said at least some audio blocks recorded in said intermediate sections of the slant tracks.

5. A method according to claim 4; in which said time code data includes frames information bits, seconds information bits, minutes information bits and hours information bits; and including recording bytes of said frames information bits, of said seconds information bits, of said minutes information bits and of said hours information bits, respectively, separated from said user bits as corresponding first ones of said user control words in said at least some audio blocks, and recording bytes of said user bits separated from said time code data as corresponding second ones of said user control words.

6. A method according to claim 1; including recording the digital video signal for each frame in said other sections of a predetermined number of said slant tracks; recording a plurality of channels of said digital audio signal; processing said digital audio signal in segments each corresponding, in duration, to the time required for scanning of a group of said slant tracks which are a fraction of said predetermined number of slant tracks, and each including a plurality of said audio blocks respectively containing data words representing odd and even samples of each of said channels and each further containing respective user control words; recording, in said intermediate sections of each said group of said slant tracks, a number of audio sectors for respectively containing said blocks corresponding to odd and even samples of each of said channels and duplicates thereof in a scattered arrangement within said intermediate sections of the corresponding group of said slant tracks; and recording said time code signal as said user control words of selected blocks of each audio segment corresponding to said odd and even samples of at least one of said channels and the duplicates of said selected blocks, said time code signal being the same for all of said segments of the audio signal recorded in said intermediate sections of the slant tracks corresponding to a respective one of said frames.

7. A method according to claim 6; including recording the digital video signal for each frame in said other sections of twenty successive slant tracks, each of said groups of slant tracks contains four successive tracks, each of said slant tracks has four of said audio sectors in said intermediate section thereof, and recording said time code signal as said user control words in the scattered arrangement of said audio sectors of each audio signal segment which have recorded therein said odd and even samples of one of said channels and duplicates thereof.

8. A method according to claim 7; including arranging said audio sectors in each of said slant tracks in rows with respect to said audio sectors in the adjacent slant tracks, and said scattered arrangement is such that two spaced apart rows of said audio sectors for a respective audio signal segment contain even samples of respective channels in different orders and the other two of said rows of audio sectors contain odd samples of respective channels in orders that are different from each other and also different from said orders of the first mentioned two rows.

9. A method for tape recording a time code signal together with digital video and audio signals comprising:
scanning successive slant tracks extending obliquely across a tape;
processing at least one channel of a digital audio signal into audio blocks each comprised of data words and user control words;
recording said audio blocks in first sections of said slant tracks;
recording a digital video signal in other sections of slant tracks which are relatively longer than said first sections of said slant tracks; and
recording a time code signal representing time codes as said user control words in at least some of said audio blocks recorded in said first sections of said slant tracks.

10. A method according to claim 9; in which said time code signal includes time code data and user bits associated therewith in respective bytes; and including separating said time code data and said user bits from the respective bytes of the time code signal, and recording the separated time code data and user bits as respective ones of said user control words in said at least some audio blocks recorded in said first sections of the slant tracks.

11. A method according to claim 10; in which said time code data includes frames information bits, seconds information bits, minutes information bits and hours information bits; and including recording bytes of said frames information bits, of said seconds information bits, of said minutes information bits and of said hours information bits, respectively, separated from said user bits as corresponding first ones of said user control words in said at least some audio blocks, and recording bytes of said user bits separated from said time code data as second ones of said user control words.

12. A method according to claim 9; including recording the digital video signal for each frame in said other sections of a predetermined number of said slant tracks; recording a plurality of channels of said digital audio signal; processing said digital audio signal in segments each corresponding, in duration, to the time required for scanning of a group of said slant tracks which are a fraction of said predetermined number of slant tracks, and each including blocks respectively containing data words representing odd and even samples of each of said channels, and each further containing user control words; recording in said first sections of each said group of said slant tracks, a number of audio sectors for respectively containing said blocks corresponding to odd and even samples of each of said channels and duplicates thereof in a scattered arrangement within said first sections of the corresponding group of said slant tracks; and recording said time code signal as said user control words of selected blocks of each audio segment corresponding to said odd and even samples of at least one of said channels and the duplicates of said selected blocks, said time code signal being the same for all of said segments of the audio signal recorded in said first sections of the slant tracks corresponding to a respective one of said frames.

13. A method for tape recording and reproducing a time code signal together with digital video and audio signals comprising:
in a recording phase,
processing at least one channel of a digital audio signal into audio blocks each comprised of data words and user control words,
recording said audio blocks in intermediate sections of successively scanned slant tracks which extend obliquely across a tape, with each of said intermediate sections being spaced from the opposite ends of the respective tracks,
recording a digital video signal in other sections of said slant tracks which are located before and after said intermediate sections considered in the direction in which said slant tracks are scanned, and
recording digital time code signals representing time codes as said user control words in at least some of said audio blocks recorded in said intermediate sections of said slant tracks, with said time code signals recorded in said intermediate sections of a successive plurality of said slant tracks representing the same time codes; and,
in a reproducing phase,
reproducing said digital video signals and audio blocks recorded in said successive tracks,
separating said digital time code signals and audio signals from the separated audio blocks, and
reading time codes from said separated digital time code signals.

14. A method according to claim 13; including advancing the tape at substantially different speeds during said recording and reproducing phases, respectively, and performing the following additional steps in said reproducing phase:

detecting erroneous bits in the reproduced digital time code signals, storing from each reproduced digital time code signal only those bits indicated to be free of error, and reading said time codes from the stored bits which are free of error and which are drawn from reproduced digital time code signals representing the same time code.

15. A method according to claim 13; in which each of said digital time code signals includes time code data and user bits associated therewith in respective bytes; and including, in said reproducing phase, separating said time code data and said user bits from the respective bytes of the respective time code signal, and recording the separated time code data and user bits as respective ones of said user control words in a respective one of said at least some audio blocks recorded in said intermediate sections of the slant tracks.

16. A tape recording apparatus comprising:
head means scanning successive slant tracks extending obliquely across a tape;
audio processing means for processing at least one channel of a digital audio signal into audio blocks each comprised of data words and user control words;
video processing means providing a digital video signal;
means for generating a time code signal representing successive time codes; and
time multiplexing means for supplying said audio blocks, said video signals and said time code signal to said head means for recording said audio blocks in intermediate sections of said slant tracks which are spaced from the opposite ends of the respective tracks, for recording said digital video signal in other sections of said slant tracks which are located before and after said intermediate sections considered in the direction of said scanning, and for recording said time code signal as said user control words in at least some of said audio blocks recorded in said intermediate sections of said slant tracks with the time code signal in said audio blocks recorded in the intermediate sections of a successive plurality of said slant tracks representing the same time code.

17. A tape recording apparatus according to claim 16; in which the digital video signal for each frame is recorded in said other sections of a predetermined number of said slant tracks, said digital audio signal is processed in segments each corresponding, in duration, to the time required for scanning of a group of said slant tracks which are a fraction of said predetermined number of slant tracks, and there is a plurality of channels of said digital audio signal to be recorded; said audio processing means includes data distributing means for distributing the data for each of said segments of the audio signal into audio blocks respectively comprised of data words representing odd and even samples of each of said channels, with each of said audio blocks further containing user control words, and for recording, in each said group of said slant tracks, a number of audio sectors in said intermediate sections thereof containing said respective audio blocks corresponding to odd and even samples of each of said channels and duplicates thereof in a scattered arrangement within said intermediate sections of the corresponding group of said slant tracks; and for inserting said time code signal as said user control words of selected blocks of each audio segment corresponding to said odd and even samples of at least one of said channels and the duplicates of said selected blocks, and said time code signal is the same for all of said segments of the audio signal recorded in said intermediate sections of the slant tracks corresponding to a respective one of said frames.

18. A tape recording apparatus according to claim 17; in which the digital video signal for each frame is recorded in said other sections of twenty successive slant tracks, each of said groups of slant tracks contains four successive tracks, each of said slant tracks has four of said audio sectors in said intermediate section thereof, and said time code signal is recorded as said user control words in the scattered arrangement of said audio sectors of each audio signal segment which have recorded therein said odd and even samples of one of said channels and duplicates thereof.

19. A tape recording apparatus according to claim 18; in which said audio sectors in each of said slant tracks are arranged in rows with respect to said audio sectors in the adjacent slant tracks, and said scattered arrangement is such that two spaced apart rows of said audio sectors for a respective audio signal segment contain even samples of respective channels in different orders and the other two of said rows of audio sectors contain odd samples of respective channels in orders that are different from each other and also different from said orders of the first mentioned two rows.

20. A tape recording apparatus according to claim 16; in which said time code signal includes time code data and user bits associated therewith in respective bytes; and including time code distributing means for separating said time code data and said user bits from the respective bytes of the time code signal, and for recording the separated time code data and user bits as respective one of said user control words in said at least some audio blocks recorded in said intermediate sections of the slant tracks.

21. A tape recording apparatus according to claim 20; in which said time code data includes frames information bits, seconds information bits, minutes information bits and hours information bits; and said time code distributing means effects recording of bytes of said frames information bits, of said seconds information bits, of said minutes information bits and of said hours information bits, respectively, separated from said user bits as corresponding first ones of said user control words in said at least some audio blocks, and recording of bytes of said user bits separated from said time code data as corresponding second ones of said user control words.

22. A tape recording apparatus according to claim 16; in which said other sections of the slant tracks are relatively longer than said intermediate sections of slant tracks.

23. A tape recording and reproducing apparatus comprising:
head means for scanning successive slant tracks extending obliquely across a tape;
audio processing means for processing at least one channel of a digital audio signal into audio blocks each comprised of data words and user control words;
video processing means for providing a digital video signal;
means for generating a time code signal representing successive time codes;
time multiplexing means operative in a recording mode of the apparatus for supplying said audio blocks, said video signals and said time code signal to said head means for recording said audio blocks in intermediate sections of said slant tracks which are spaced from the opposite ends of the respective tracks, for recording said digital video signal in other sections of said slant tracks which are located before and after said intermediate sections considered in the direction of said scanning, and for recording said time code signal as said user control words in at least some of said audio blocks recorded sections of said slant tracks, with the time code signal in said audio blocks recorded in said intermediate sections of a successive plurality of said slant tracks representing the same time code;

means operative in a reproducing mode of the apparatus for separating the reproduced digital video signals and audio blocks from the output of said head means and for separating the digital time code signal and audio signals from the separated audio blocks; and means for reading time codes from the digital time code signal separated from the reproduced audio blocks.

24. The tape recording and reproducing apparatus according to claim 23; further comprising means for driving the tape at a different speed in said reproducing mode than in said recording mode, means for detecting erroneous bits in the reproduced digital time code signal, and means for storing, from each reproduced digital time code signal, only those bits indicated to be free of error; and in which said means for reading time codes reads the stored bits which are free of error and which are drawn from reproduced digital time code signals representing the same time code.

25. The tape recording and reproducing apparatus according to claim 23; in which said time code signal includes time code data and user bits associated therewith in respective bytes; and including time code distributing means for separating said time code data and said user bits from the respective bytes of the time code signal, and for recording the separated time code data and user bits as respective ones of said user control words in said at least some audio blocks recorded in said intermediate sections of the slant tracks.

26. The tape recording and reproducing apparatus according to claim 25; in which said time code data includes frames information bits, seconds information bits, minutes information bits and hours information bits; and said time code distributing means effects recording of bytes of said frames information bits, of said seconds information bits, of said minutes information bits and of said hours information bits, respectively, separated from said user bits as corresponding first ones of said user control words in said at least some audio blocks, and recording of bytes of said user bits separated from said time code data as corresponding second ones of said user control words.

* * * * *